United States Patent
Shah et al.

(10) Patent No.: US 12,270,655 B2
(45) Date of Patent: Apr. 8, 2025

(54) ESTIMATING ROAD GRADE FOR INERTIAL MEASUREMENT UNIT CALIBRATION IN AN UNMAPPED ENVIRONMENT

(71) Applicant: GM Cruise Holdings LLC, San Francisco, CA (US)

(72) Inventors: Mayur Nitinbhai Shah, Pleasanton, CA (US); Vincent Kee, San Francisco, CA (US); Adria Serra Moral, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 342 days.

(21) Appl. No.: 17/859,313

(22) Filed: Jul. 7, 2022

(65) Prior Publication Data

US 2024/0011775 A1    Jan. 11, 2024

(51) Int. Cl.
| | |
|---|---|
| *G01C 21/16* | (2006.01) |
| *B60W 40/06* | (2012.01) |
| *B60W 50/06* | (2006.01) |
| *B60W 60/00* | (2020.01) |
| *G01C 25/00* | (2006.01) |
| *G01S 17/89* | (2020.01) |

(52) U.S. Cl.
CPC ......... *G01C 21/1652* (2020.08); *B60W 40/06* (2013.01); *B60W 50/06* (2013.01); *B60W 60/001* (2020.02); *G01C 25/005* (2013.01); *G01S 17/89* (2013.01); *B60W 2520/16* (2013.01); *B60W 2520/18* (2013.01); *B60W 2552/00* (2020.02)

(58) Field of Classification Search
CPC ............. G01C 21/1652; G01C 25/005; B60W 40/06; B60W 50/06; B60W 60/001; B60W 2520/16; B60W 2520/18; B60W 2552/00; G01S 17/89
See application file for complete search history.

(56) References Cited

U.S. PATENT DOCUMENTS

| | | | |
|---|---|---|---|
| 11,623,494 B1 * | 4/2023 | Arnicar | G01S 17/931 701/37 |
| 2018/0313868 A1 * | 11/2018 | Sljivar | G01P 21/00 |
| 2020/0132462 A1 * | 4/2020 | Shibata | G01C 25/005 |
| 2022/0075387 A1 * | 3/2022 | Choi | B60W 30/14 |

\* cited by examiner

*Primary Examiner* — James J Lee
*Assistant Examiner* — Jonathan E Reinert

(57) ABSTRACT

The subject disclosure relates to estimating a grade of a road and calibrating sensors of an autonomous vehicle based on the grade. A process of the disclosed technology can include effectuating an autonomous vehicle to perform one or more maneuvers that cause the autonomous vehicle to face different directions along a road, obtaining a first set of sensor measurements of an autonomous vehicle in a first pose, wherein the first set of sensor measurements includes a first measured specific force, obtaining a second set of sensor measurements of the autonomous vehicle in a second pose, wherein the second set of sensor measurements includes a second measured specific force, determining a direction of gravity based on the first measured specific force and the second measured specific force, and calibrating at least one sensor of the autonomous vehicle based on the determined direction of gravity.

20 Claims, 5 Drawing Sheets

ESTIMATING ROAD GRADE FOR INERTIAL MEASUREMENT UNIT CALIBRATION IN AN UNMAPPED ENVIRONMENT

TECHNICAL FIELD

The subject technology provides solutions for estimating a grade of a road, and more particularly, to effectuating motion of an autonomous vehicle to perform at least one maneuver to position the autonomous vehicle in at least two poses to obtain sensor measurements and determining, based on the sensor measurements, the grade of the road.

BACKGROUND

An autonomous vehicle is a motorized vehicle that can navigate without a human driver. An exemplary autonomous vehicle includes a plurality of sensor systems, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
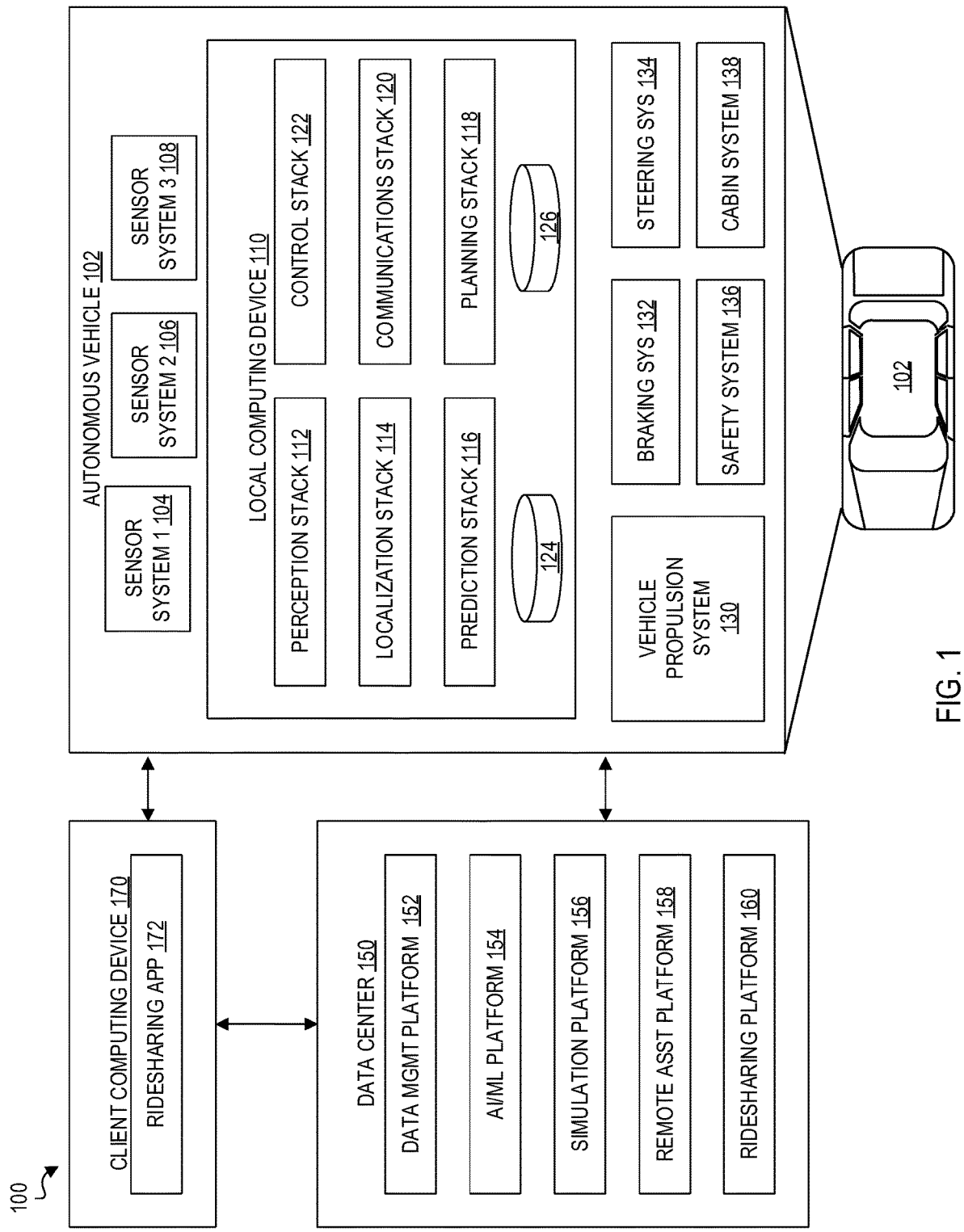
FIG. 1 illustrates an example of a system for managing one or more Autonomous Vehicles (AVs), in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

As discussed above, an autonomous vehicle is a motorized vehicle that relies heavily on various sensors. As more autonomous vehicles are manufactured, there is an exponential need for calibration of these sensors. In some instances, sensors of autonomous vehicles are calibrated in well-known environments or facilities. However, as the number of autonomous vehicles keeps increasing, these facilities may not have enough capacity to calibrate at the same rate as the autonomous vehicles are manufactured and/or deployed.

Closed or otherwise designated calibration facilities may be used because the facilities are heavily controlled specifically for calibrating sensors. For example, the facilities may be heavily mapped and/or tagged, such that technicians calibrating the sensors know exactly the correct position/placement, orientation, and alignment of each sensor on each autonomous vehicle. Additionally, technicians may not be readily available at all times to monitor calibration of autonomous vehicles being calibrated.

Thus, there is a need in the art for calibrating sensors of an autonomous vehicle without a structured or specific facility and without excessive human intervention. However, enabling autonomous vehicles to self-calibrate sensors still poses many challenges. Especially in unstructured environments, there are many unknown variables that can affect sensor calibration. One such variable is a grade of a road that an autonomous vehicle may be on. Uncalibrated sensors of an autonomous vehicle are not able to understand whether the road is flat, inclined, or declined. Although described as a road, one of ordinary skill in the art would understand that the present technology can extend to streets, roadways, highways, parking lots, or any other area that the autonomous vehicle may be on.

The present technology provides solutions for estimating the grade of the road that the autonomous vehicle may be on. One aspect of the present technology includes effectuating motion of the autonomous vehicle, such that the autonomous vehicle performs one or more maneuvers that cause the autonomous vehicle to move in a loop. The present technology also discloses obtaining sensor measurements at one or more positions in the loop, while the autonomous vehicle is facing one or more directions. Although described as a loop, one of ordinary skill in the art would understand that one or more maneuvers that cause the autonomous vehicle to face different directions (e.g., on a road) is also sufficient. Thus, the usage of a loop is solely for clarity and discussion purposes. The autonomous vehicle (e.g., via an internal computing system) can determine, based on the sensor measurements, a grade estimate of the road that the autonomous vehicle is on. After determining the grade estimate of the road and/or a determined direction of gravity, the autonomous vehicle can then calibrate the sensors based on the road grade and/or the determined direction of gravity.

FIG. 1 illustrates an example of an autonomous vehicle (AV) management system 100, according to one example embodiment. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the roads and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
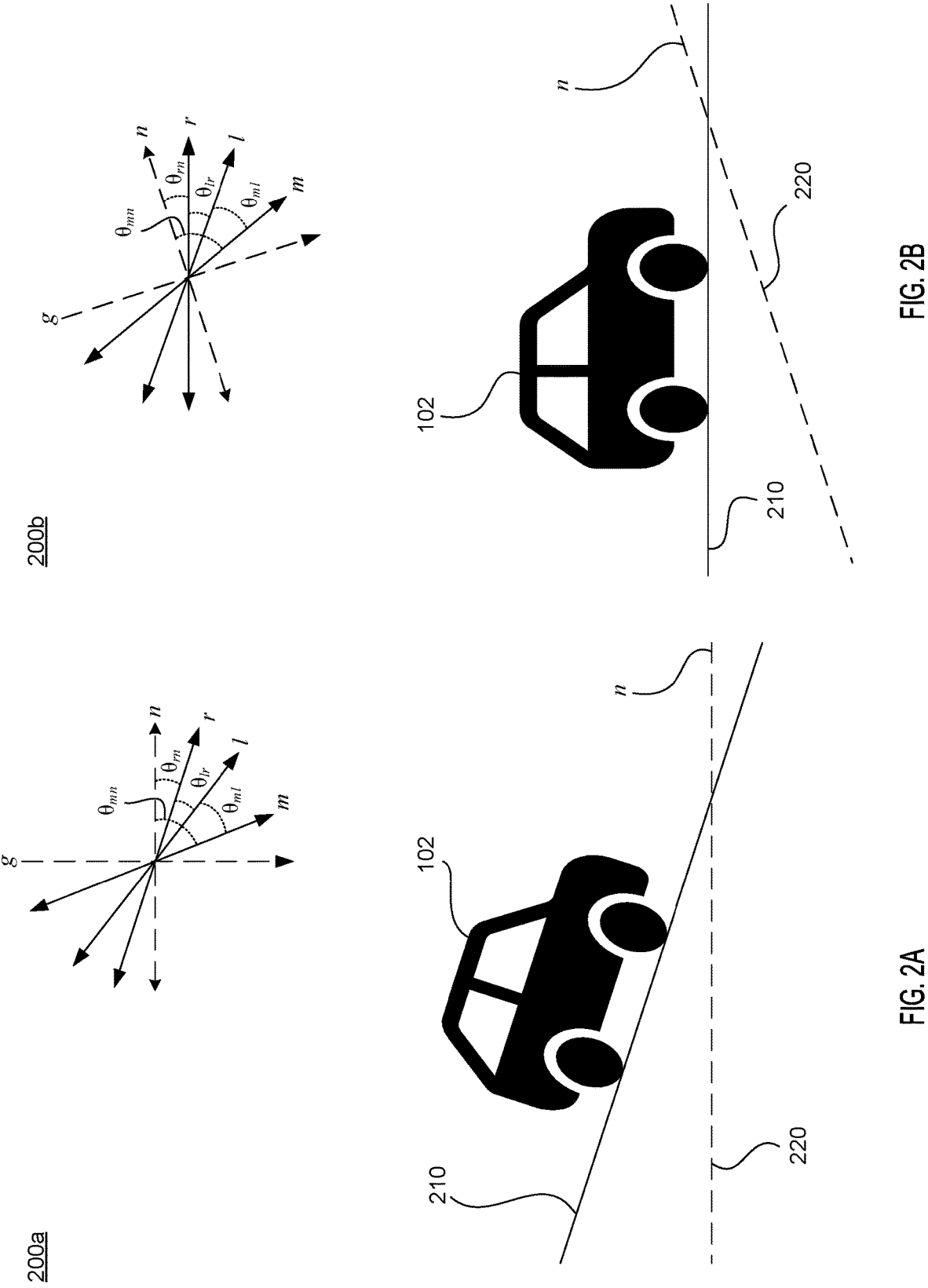
FIG. 2A illustrates an example environment having an AV on a road, in accordance with some aspects of the present technology.
FIG. 2B illustrates an example environment having an AV on a road, in accordance with some aspects of the present technology.

FIGS. 2A and 2B (collectively FIG. 2) illustrate example environments 200a, 200b (collectively environment(s) 200) having autonomous vehicle 102 on a road 210. More specifically, FIG. 2A illustrates an example environment 200a having autonomous vehicle 102 on road 210 that may not be aligned with a navigational plane 220 (also annotated as navigational plane n). FIG. 2B includes an example environment 200b which illustrates environment 200a redrawn to show a perspective of an uncalibrated autonomous vehicle 102.

FIG. 2A additionally illustrates a direction of gravity g that is orthogonal to navigational plane n. Navigational plane n is a gravity aligned plane, such as an x-y plane of an East, North, Up (ENU) reference frame. An ENU reference frame can be defined, such that an x-axis points east-west, a y-axis points north-south, and a z-axis points up (e.g., aligned with gravity).

Autonomous vehicle 102 may utilize various sensors to obtain sensor measurements to identify different axes. For example, autonomous vehicle 102 may utilize an IMU to determine a measured specific force and a direction of the measured specific force (e.g., along axis or direction m). For example, the measured specific force from the IMU can be stored as in equation (1) below, where $\hat{f}_{im}{}^m$ is the measured specific force, $f_{im}{}^m$ is the specific force while stationary, and $b_f$ is acceleration bias.

$$\hat{f}_{im}{}^m = f_{im}{}^m + b_f \tag{1}$$

Additionally, the specific force, when stationary, can be defined as in equation (2) below, where g is gravitational force, and $\theta_{mn}$ is an angle between the direction m of the measured specific force and the navigational plane n.

$$f_{im}{}^m = -g \cdot \sin(\theta_{mn}) \tag{2}$$

Additionally, angle $\theta_{mn}$ can be broken down into a plurality of smaller angles that combine into angle $\theta_{mn}$. More specifically, angle $\theta_{mn}$ can be broken down according to equation (3) below, where $\theta_{ml}$ is defined by an IMU to LiDAR extrinsic calibration pitch, $\theta_{lr}$ is the LiDAR odometry pitch (e.g., an angle between the LiDAR orientation l and the road plane r), and $\theta_{rn}$ is an angle between the road plane r (e.g., road 210) and the navigational plane n. Although discussed with LiDAR sensors, it is to be understood that other sensors can be used in place of LiDAR sensors and that the usage and description of LiDAR sensors is solely for clarity and discussion purposes. For example, camera sensors, radar sensors, and other sensors can be used alternatively or additionally to the LiDAR sensors. Additionally, the usage and description of pitch is also solely for clarity and discussion purposes and one of ordinary skill in the art would recognize that this disclosure can be used with and/or for roll and/or pitch. Although the usage of equation (2) applies for the pitch angle, one of ordinary skill in the art would understand that minor adjustments or similar derivations can be made to equation (2) to apply to the roll angle.

$$\theta_{mn} = \theta_{ml} + \theta_{lr} + \theta_{rn} \tag{3}$$

In other words, $\theta_{ml}$ is defined by an angle between an orientation of the IMU to an orientation of the LiDAR sensor, which extrinsically is imputed during installation and calibration of the sensors. Additionally, $\theta_{ml}$ is constant. In some embodiments, $\theta_{ml}$ is unknown.

$\theta_{lr}$ can be an angle between the LiDAR orientation l and the road plane r. In some embodiments, $\theta_{lr}$ is determined through odometry (e.g., LiDAR odometry, visual odometry, radar odometry, IMU odometry, etc.). For example, as autonomous vehicle 102 performs various maneuvers, internal computing system 110 of autonomous vehicle 102 can determine an orientation of the LiDAR sensor l in relation to the road plane r at a first point and at a second point, which can be used to determine a change in the orientation of the LiDAR sensor l in relation to the road plane r (e.g., ($\theta_{lr}(2) - \theta_{lr}(1)$)).

$\theta_{rn}$ is an angle between the road plane r (e.g., road 210) and the navigational plane n. In other words, $\theta_{rn}$ is representative of a grade of road 210 and is the angle of interest.

Figure 3:
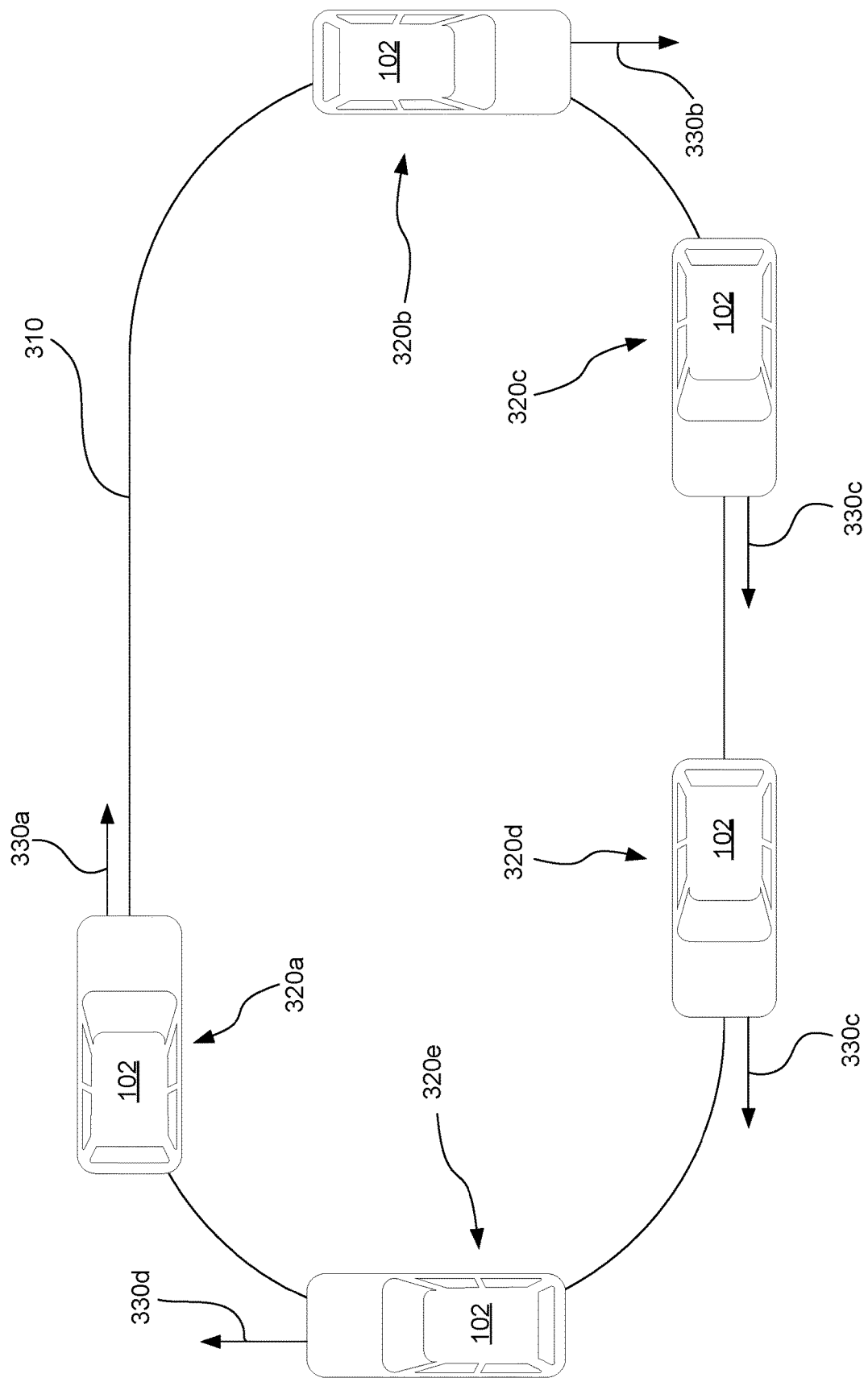
FIG. 3 illustrates an AV performing an example maneuver, in accordance with some aspects of the present technology.

FIG. 3 illustrates autonomous vehicle 102 performing an example maneuver 310. For discussion purposes, maneuver 310 will be described as a loop maneuver 310. However, one of ordinary skill in the art would understand that maneuver 310 can be any maneuver(s) that cause autonomous vehicle 102 to face more than one direction along a road. Autonomous vehicle 102 can perform a loop maneuver 310, such that autonomous vehicle 102 drives along various positions (e.g., a position 320a, a position 320b, a position 320c, a position 320d, a position 320e, collectively position(s) 320) in various segments of loop 310. As autonomous vehicle 102 drives through various positions 320, autonomous vehicle 102 can be driving in a direction (e.g., a direction 330a, a direction 330b, a direction 330c, a direction 330d, collectively direction(s) 330). For clarity and discussion purposes, autonomous vehicle 102 will be described as being in a pose, such that a pose includes a position 320 or the location of autonomous vehicle 102 facing a direction 330. For example, a first pose of autonomous vehicle 102 can include autonomous vehicle 102 at a first position 320a facing a first direction 330a, while a second pose can include the autonomous vehicle at another position (e.g., position 320d) facing another direction (e.g., direction 330c). In some embodiments, poses may include directions or positions that are the same as other poses.

Thus, autonomous vehicle 102 can navigate or perform loop maneuver 310, such that a first pose of autonomous vehicle 102 includes autonomous vehicle 102 at position 320a facing direction 330a, while a second pose of autonomous vehicle 102 includes autonomous vehicle 102 at position 320d facing direction 330c. As further illustrated in FIG. 3, direction 330a and direction 330c are facing substantially opposite directions (e.g., 180° yaw difference). For two poses that are facing opposite directions, equation (4) can be used, such that $\theta_{rn}(1)$ is the angle between the road plane r and the navigational plane n in the first pose and $\theta_{rn}(2)$ is the angle between the road plane r and the navigational n in the second pose. Although discussed using opposite directions, one of ordinary skill in the art would understand that other directions can be used. In other words, the usage and discussion of opposite directions is solely for clarity and discussion purposes.

$$\theta_{rn}(1) = -\theta_{rn}(2) \quad (4)$$

The above equations can be simplified by using the Small-Angle Approximation, such that, for small angles $\sin(\theta) \approx \theta$. Thus, equation (2) can be manipulated for each pose to yield the equations (5) and (6) below, where $\hat{f}_{im}^{m}(1)$ is the measured specific force in the first pose, $\theta_{lr}(1)$ is the angle between the LiDAR orientation l and the road plane r in the first pose, $\hat{f}_{im}^{m}(2)$ is the measured specific force in the second pose, and $\theta_{lr}(2)$ is the angle between the LiDAR orientation l and the road plane r in the second pose.

$$\hat{f}_{im}^{m}(1) = b_f - g \cdot (\theta_{ml} + \theta_{lr}(1) + \theta_{rn}(1)) \quad (5)$$

$$\hat{f}_{im}^{m}(2) = b_f - g \cdot (\theta_{ml} + \theta_{lr}(2) + \theta_{rn}(2)) \quad (6)$$

By substituting equation (4) into equation (6) and subtracting measurements in opposite directions to cancel unknown variables or constants (e.g., $\theta_{ml}$, $b_f$), $\theta_{rn}(1)$ can be isolated and determined as shown in equation (7) below. However, as discussed above, the usage and discussion of opposite directions of autonomous vehicle 102 is solely for clarity and discussion purposes. One of ordinary skill in the art would understand that any combination of directions can be used to facilitate determining grade $\theta_{rn}$ of road 210.

$$\theta_{rn}(1) = (\hat{f}_{im}^{m}(2) - \hat{f}_{im}^{m}(1))/(2g) + (\theta_{lr}(2) - \theta_{lr}(1))/2 \quad (7)$$

Thus, the grade $\theta_{rn}$ of road 210 is determined. Additionally, the direction of gravity g is also determined. As discussed above, the direction of gravity g is orthogonal to navigational plane n. Thus, by determining the grade $\theta_{rn}$ of road 210 and the pose of autonomous vehicle 102 thereon, the direction of gravity g can be determined. After determining the grade $\theta_{rn}$ of road 210 and/or the direction of gravity g, sensors of the autonomous vehicle 102 can be calibrated. For example, internal computing system 110 can calibrate one or more sensors of autonomous vehicle 102 by offsetting calibration of the one or more sensors by the grade $\theta_{rn}$ of road 210 and/or by indicating the direction of gravity g as an anchoring value. In some embodiments, internal computing system 110 can estimate biases, such as an accelerometer bias, and determine an improved motion estimate from inertial-only data, which can be used to calibrate any IMU-to-sensor link. Additionally, once the direction of gravity g is determined, internal computing system 110 can distinguish between $\theta_{ml}$ and $\theta_{lr}$ of any other sensor. For example, a side LiDAR or radar could be angled toward the ground, internal computing system 110 can determine the relative orientation of the side LiDAR or radar with respect to the ground, subtract the known ground orientation, and determine $\theta_{ml}$.

Figure 4:
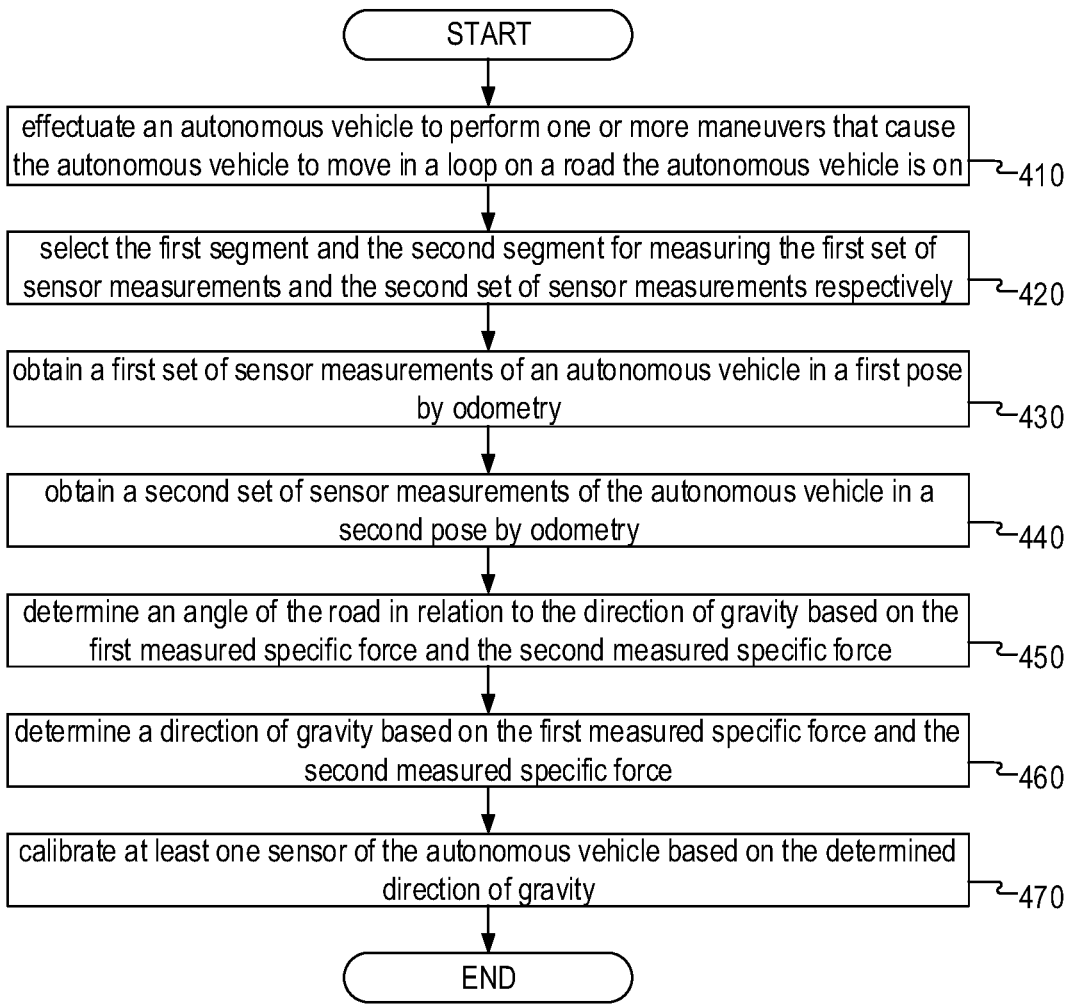
FIG. 4 illustrates an example method for estimating a grade of a road an AV is on, in accordance with some aspects of the present technology.

FIG. 4 illustrates an example method 400 for estimating a grade of a road an autonomous vehicle is on. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Method 400 includes effectuating 410 an autonomous vehicle to perform one or more maneuvers that cause the autonomous vehicle to more than one direction along a road. For example, internal computing system 110 illustrated in FIG. 1 may effectuate 410 an autonomous vehicle to perform one or more maneuvers that cause the autonomous vehicle to face more than one direction along a road. In some embodiments, the road may be a loop. In some embodiments, the first pose is in a first segment of the road and the second pose is in a second segment of the road.

Method 400 can then include selecting 420 the first segment and the second segment for measuring the first set of sensor measurements and the second set of sensor measurements respectively. For example, internal computing system 110 illustrated in FIG. 1 may select 420 the first segment and the second segment for measuring the first set of sensor measurements and the second set of sensor measurements respectively. In some embodiments, the first segment and the second segment are selected based on a distance between the first segment and the second segment. In some embodiments, the first segment and the second segment are selected based on directions that the autonomous vehicle is facing at the first segment and the second segment. In some embodiments, the first segment and the second segment are selected, such that the autonomous vehicle is facing opposite directions at the first segment and the second segment. In some embodiments, the first segment and the second segment are selected based on a cost function that depends on or is based on distance between the first segment and the second segment and differences in direction between the first segment and the second segment. For example, the cost may be lower when the segments are in opposite direction and/or the cost may be lower when the segments are closer to each other. In some embodiments, the segments can be selected in a way where the autonomous vehicle is stationary for each of the first segment and the second segment. In some embodiments, the segments can also be selected for the portions when the autonomous vehicle is moving and a linear acceleration at each segment is considered. In some embodiments, a function can include all stationary segments, filter all segments down to segment pairs that are substantially opposite in direction, and select the segment pair that is closest in position to each other (e.g., the segment pair with the shortest distance therebetween).

wherein the first segment and the second segment are selected using a cost function based on distance between the first segment and the second segment and differences in direction between the first segment and the second segment Method 400 can then include obtaining 430 a first set of sensor measurements of an autonomous vehicle in a first pose. For example, internal computing system 110 illustrated in FIG. 1 may obtain 430 a first set of sensor measurements of an autonomous vehicle in a first pose. In some embodiments, the first set of sensor measurements includes a first measured specific force. In some embodiments, the first set of sensor measurements can include one or more LiDAR points to form a first LiDAR point cloud. In some embodiments, the first set of sensor measurements can include one or more frames recorded by a camera.

Method 400 can then include obtaining 440 a second set of sensor measurements of the autonomous vehicle in a second pose. For example, the internal computing system illustrated in FIG. 1 may obtain 440 a second set of sensor measurements of the autonomous vehicle in a second pose. In some embodiments, the second set of sensor measurements includes a second measured specific force. In some embodiments, the second set of sensor measurements can include one or more LiDAR points to form a second LiDAR point cloud. In some embodiments, the first LiDAR point cloud can be fused with the second LiDAR point cloud to form a fused LiDAR point cloud that is used to determine a LiDAR orientation in relation to the road. In other words, the fused LiDAR point cloud can be used to determine an angle between the LiDAR orientation and the road plane. In some embodiments, the second set of sensor measurements can include one or more frames recorded by a camera. In some embodiments, the one or more frames can be combined to form a combined frame having objects. The objects can be tracked to determine a camera orientation in relation to the road. In other words, the combined frame and the tracked objects can be used to determine an angle between the camera orientation and the road plane. In some embodiments, the autonomous vehicle faces a first direction in the first pose and the autonomous vehicle faces a second direction in the second pose. In some embodiments, a relative orientation of the first segment to the second segment is also determined, measured, and/or obtained based on sensor odometry (e.g., LiDAR odometry, radar odometry, camera odometry, IMU odometry, etc.).

Method 400 can then include determining 450 an angle of the road in relation to the direction of gravity and/or a navigational plane based on the first measured specific force and the second measured specific force. For example, internal computing system 110 illustrated in FIG. 1 may determine 450 an angle of the road in relation to the direction of gravity based on the first measured specific force and the second measured specific force.

Method 400 can then include determining 460 a direction of gravity based on the first measured specific force and the second measured specific force. For example, internal computing system 110 illustrated in FIG. 1 may determine a direction 460 of gravity based on the first measured specific force and the second measured specific force. In some embodiments, determining 460 the direction of gravity includes deriving a roll angle of the autonomous vehicle. In some embodiments, determining 460 the direction of gravity includes deriving a pitch angle of the autonomous vehicle. In some embodiments, determining 460 the direction of gravity includes deriving both a roll angle and a pitch angle of the autonomous vehicle.

Method 400 can then include calibrating 470 at least one sensor of the autonomous vehicle based on the determined direction of gravity and/or the angle of road in relation to the direction of gravity and/or the navigational plane. For example, internal computing system 110 illustrated in FIG. 1 may calibrate 470 at least one sensor of the autonomous vehicle based on the determined direction of gravity.

Figure 5:
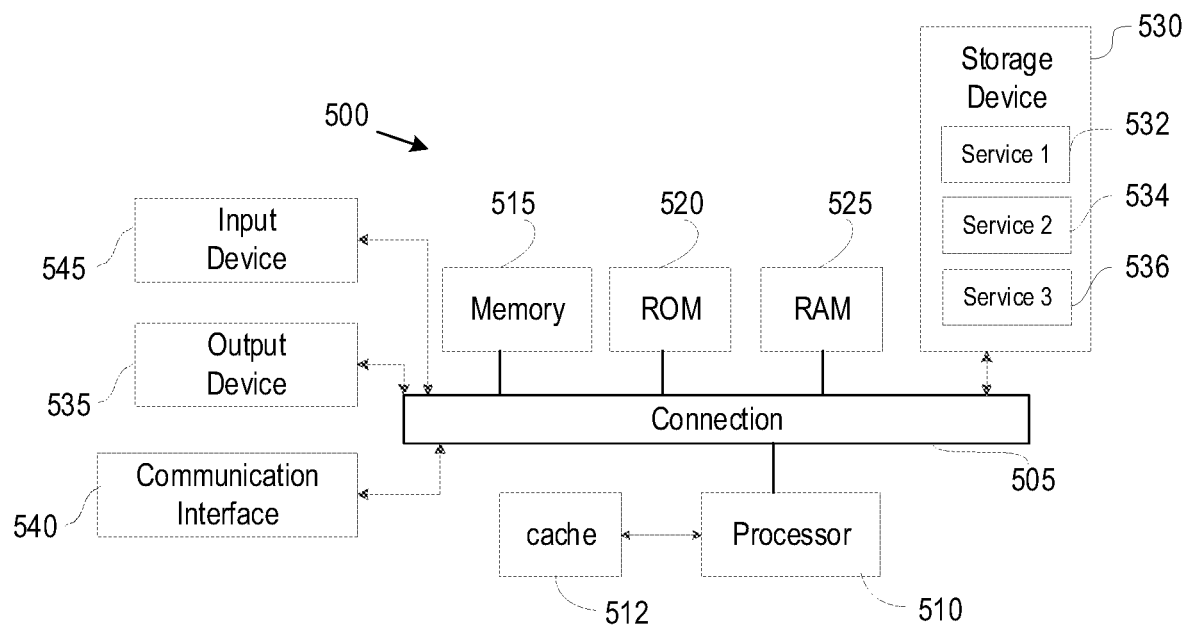
FIG. 5 shows an example of a system for implementing certain aspects of the present technology.

FIG. 5 shows an example of computing system 500, which can be for example any computing device making up autonomous vehicle 102, internal computing system 110, data center 150, client computing device 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
effectuating an autonomous vehicle to perform one or more maneuvers that cause the autonomous vehicle to face different directions along a road;
obtaining a first set of sensor measurements of the autonomous vehicle in a first pose, wherein the first set of sensor measurements includes a first measured specific force, wherein the first measured specific force is calculated as the sum of a specific force while the autonomous vehicle is stationary and an acceleration bias, wherein the specific force while the autonomous vehicle is stationary is calculated based on a gravitational constant value and an angle associated with a light detection and ranging sensor odometry pitch;
obtaining a second set of sensor measurements of the autonomous vehicle in a second pose, wherein the second set of sensor measurements includes a second measured specific force;
determining a direction of gravity based on the first measured specific force and the second measured specific force; and
calibrating at least one sensor of the autonomous vehicle based on the determined direction of gravity.

2. The computer-implemented method of claim 1, further comprising:
determining an angle of the road in relation to the direction of gravity based on the first measured specific force and the second measured specific force.

3. The computer-implemented method of claim 1, wherein the first pose is in a first segment of the road and the second pose is in a second segment of the road.

4. The computed-implemented method of claim 3, further comprising:
selecting the first segment and the second segment for measuring the first set of sensor measurements and the second set of sensor measurements respectively.

5. The computer-implemented method of claim 4, wherein the first segment and the second segment are selected based on a distance between the first segment and the second segment.

6. The computer-implemented method of claim 4, wherein the first segment and the second segment are selected using a cost function based on distance between the first segment and the second segment and differences in direction between the first segment and the second segment.

7. The computer-implemented method of claim 4, wherein the first segment and the second segment are selected based on directions that the autonomous vehicle is facing at the first segment and the second segment.

8. The computer-implemented method of claim 1, wherein the autonomous vehicle faces a first direction in the first pose and the autonomous vehicle faces a second direction in the second pose.

9. The computer-implemented method of claim 1, wherein determining the direction of gravity includes deriving a roll angle of the autonomous vehicle.

10. The computer-implemented method of claim 1, wherein determining the direction of gravity includes deriving a pitch angle of the autonomous vehicle.

11. A non-transitory computer readable medium comprising instructions, the instructions, when executed by a computing system, cause the computing system to:
- effectuate an autonomous vehicle to perform one or more maneuvers that cause the autonomous vehicle to face different directions along a road;
- obtain a first set of sensor measurements of the autonomous vehicle in a first pose, wherein the first set of sensor measurements includes a first measured specific force, wherein the first measured specific force is calculated as the sum of a specific force while the autonomous vehicle is stationary and an acceleration bias, wherein the specific force while the autonomous vehicle is stationary is calculated based on a gravitational constant value and an angle associated with a road plane and a navigational plane;
- obtain a second set of sensor measurements of the autonomous vehicle in a second pose, wherein the second set of sensor measurements includes a second measured specific force; and
- determine a direction of gravity based on the first measured specific force and the second measured specific force.

12. The computer readable medium of claim 11, wherein the computer readable medium further comprises instructions that, when executed by the computing system, cause the computing system to:
- determine an angle of the road in relation to the direction of gravity based on the first measured specific force and the second measured specific force.

13. The computer readable medium of claim 11, wherein the computer readable medium further comprises instructions that, when executed by the computing system, cause the computing system to:
- calibrate at least one sensor of the autonomous vehicle based on the determined direction of gravity.

14. The computer readable medium of claim 11, wherein the autonomous vehicle faces a first direction in the first pose and the autonomous vehicle faces a second direction in the second pose.

15. The computer readable medium of claim 11, wherein determining the direction of gravity includes deriving a roll angle of the autonomous vehicle.

16. A system comprising:
- a storage configured to store instructions; and
- a processor configured to execute the instructions and cause the processor to:
  - effectuate an autonomous vehicle to perform one or more maneuvers that cause the autonomous vehicle to face different directions along a road;
  - obtain a first set of sensor measurements of the autonomous vehicle in a first pose, wherein the first set of sensor measurements includes a first measured specific force, wherein the first measured specific force is calculated as the sum of a specific force while the autonomous vehicle is stationary and an acceleration bias, wherein the specific force while the autonomous vehicle is stationary is calculated based on a gravitational constant value and an angle associated with a road plane and a navigational plane;
  - obtain a second set of sensor measurements of the autonomous vehicle in a second pose, wherein the second set of sensor measurements includes a second measured specific force;
  - determine a direction of gravity based on the first measured specific force and the second measured specific force; and
  - calibrate at least one sensor of the autonomous vehicle based on the determined direction of gravity.

17. The system of claim 16, wherein the processor is configured to execute the instructions and cause the processor to:
- determine an angle of the road in relation to the direction of gravity based on the first measured specific force and the second measured specific force.

18. The system of claim 16, wherein the first pose is in a first segment of the road and the second pose is in a second segment of the road.

19. The system of claim 16, wherein the autonomous vehicle faces a first direction in the first pose and the autonomous vehicle faces a second direction in the second pose.

20. The system of claim 16, wherein determining the direction of gravity includes deriving a pitch angle of the autonomous vehicle.

* * * * *